US010236792B2

(12) United States Patent
Suzuki

(10) Patent No.: US 10,236,792 B2
(45) Date of Patent: Mar. 19, 2019

(54) CONTROL SYSTEM FOR POWER CONVERSION APPARATUS

(71) Applicant: DENSO CORPORATION, Kariya, Aichi-pref. (JP)

(72) Inventor: Tomotaka Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/063,349

(22) PCT Filed: Dec. 8, 2016

(86) PCT No.: PCT/JP2016/086613
§ 371 (c)(1),
(2) Date: Jun. 18, 2018

(87) PCT Pub. No.: WO2017/104544
PCT Pub. Date: Jun. 22, 2017

(65) Prior Publication Data
US 2018/0367063 A1 Dec. 20, 2018

(30) Foreign Application Priority Data

Dec. 18, 2015 (JP) .................. 2015-247796
Dec. 8, 2016 (JP) .................. 2016-238288

(51) Int. Cl.
*H02M 1/092* (2006.01)
*H02M 7/5387* (2007.01)
*H02P 27/06* (2006.01)

(52) U.S. Cl.
CPC ......... *H02M 7/53871* (2013.01); *H02P 27/06* (2013.01)

(58) Field of Classification Search
CPC .......... H02M 1/092; H02M 7/538466; H02M 7/5387; H02M 7/53875

(Continued)

(56) References Cited

U.S. PATENT DOCUMENTS 8,432,715 B2* 4/2013 Fukuta .............. H02M 1/36 363/132
2012/0025875 A1* 2/2012 Fukuta .............. H02M 1/08 327/109

(Continued)

FOREIGN PATENT DOCUMENTS

JP 2009-136115 A 6/2009

OTHER PUBLICATIONS

Jan. 10, 2017 International Search Report issued in International Patent Application No. PCT/JP2016/086613.

*Primary Examiner* — Gary Nash
(74) *Attorney, Agent, or Firm* — Oliff PLC

(57) ABSTRACT

A first drive circuit Da includes a temperature information transmission unit that transmits a binary output signal changing between High and Low and an abnormality information transmission unit that transmits an output signal fixed to Low, and a second drive circuit Db includes the abnormality information transmission unit. A temperature information signal and an abnormality information signal from the first drive circuit Da are subjected to OR operation on the side nearer the first drive circuit Da than to a magnetic coupler Ma so the abnormality information signal takes precedence when the abnormality information signal represents an abnormality, or on the side nearer a control unit than to the insulation elements Da and Db so the output signal from the insulation element Db takes precedence when the abnormality information signal from the second drive circuit Da represents an abnormality, and then the logical sum is output to the control unit.

8 Claims, 6 Drawing Sheets

(58) Field of Classification Search
USPC ............ 363/55, 56.02, 78, 95, 98, 132, 137
See application file for complete search history.

(56) References Cited

U.S. PATENT DOCUMENTS

| | | | | |
|---|---|---|---|---|
| 2012/0286717 | A1* | 11/2012 | Fukuta .................. | B60L 11/123 |
| | | | | 318/722 |
| 2013/0181640 | A1* | 7/2013 | Fukuta ................ | H03K 17/166 |
| | | | | 318/139 |
| 2014/0055897 | A1* | 2/2014 | Tsunekawa ............. | H02H 3/20 |
| | | | | 361/86 |
| 2014/0062361 | A1* | 3/2014 | Suzuki ................... | H02M 1/08 |
| | | | | 318/400.17 |
| 2014/0092653 | A1* | 4/2014 | Suzuki ................... | H02M 1/08 |
| | | | | 363/55 |
| 2014/0217942 | A1* | 8/2014 | Fukuta .............. | H02M 7/53875 |
| | | | | 318/400.27 |
| 2014/0285002 | A1* | 9/2014 | Onishi ................. | B60L 15/007 |
| | | | | 307/10.1 |
| 2014/0307492 | A1* | 10/2014 | Suzuki ................... | H02M 1/32 |
| | | | | 363/56.01 |
| 2014/0307495 | A1* | 10/2014 | Fukuta ................... | H02H 3/08 |
| | | | | 363/98 |
| 2014/0340948 | A1* | 11/2014 | Suzuki ................. | H02M 7/537 |
| | | | | 363/40 |

* cited by examiner

| Da | Pb | Da | | | Ma | Db | | Mb | CONTROL UNIT |
|---|---|---|---|---|---|---|---|---|---|
| | | P1 | P2 | P3 | P4 | P1 | P2 | P5 | P6 |
| | | TEMPERATURE | ABNORMAL | TEMPERATURE & ABNORMALITY | Ma OUTPUT | - | ABNORMAL | Mb OUTPUT | CONTROL UNIT INPUT |
| NORMAL | NORMAL | duty | Hi-Z | duty | duty | - | Hi-Z | Hi-Z | duty |
| ABNORMAL | NORMAL | duty | Lo | Lo | Lo | - | Hi-Z | Hi-Z | Lo |
| NORMAL | ABNORMAL | duty | Hi-Z | duty | duty | - | Lo | Lo | Lo |
| ABNORMAL | ABNORMAL | duty | Lo | Lo | Lo | - | Lo | Lo | Lo | ions
CONTROL SYSTEM FOR POWER CONVERSION APPARATUS

CROSS-REFERENCE TO RELATED APPLICATION

This application is based on Japanese Patent Application No. 2015-247796 filed on Dec. 18, 2015 and Japanese Patent Application No. 2016-238288 filed on Dec. 8, 2016, the descriptions of which are incorporated herein by reference.

TECHNICAL FIELD

The present invention relates to a control system applied to a power circuit including a plurality of semiconductor switching elements. The control system for the power circuit includes a control unit controlling open/close states of the plurality of semiconductor switching elements.

BACKGROUND ART

An inverter unit driving an in-vehicle electric motor constitutes a high-voltage system, and a control unit controlling the inverter unit constitutes a low-voltage system insulated from the high-voltage system. When the inverter unit transmits to the control unit a signal representing temperature information on the semiconductor switching elements constituting the inverter unit or a signal representing abnormality information for notifying an abnormality in the semiconductor switching elements, the high-voltage system transmits the signal to the low-voltage system. Since the high-voltage system is insulated from the low-voltage system, the signal transmission from the inverter unit to the control unit is conducted via insulation elements.

PTL 1 describes a configuration for transmitting a signal representing temperature information and a signal representing abnormality information via a common insulation element for the purpose of decreasing the number of insulation elements used.

CITATION LIST

Patent Literature

[PTL 1] JP 2009-136115 A

SUMMARY OF THE INVENTION

According to the configuration described in PTL 1, the time ratio of a pulse signal represents the temperature information on the semiconductor switching element. In addition, a pulse signal shorter than the signal representing the temperature information represents the abnormality information on the semiconductor switching element higher in urgency than the temperature information. Then, the signal representing the temperature information and the signal representing the abnormality information are superimposed, and a signal obtained by applying a low-pass filter to the superimposed signal is compared to a signal obtained by applying a delay circuit to the superimposed signal to reconstruct the signal representing the abnormality information.

PTL 1 describes the configuration for informing the occurrence and termination of an abnormality in the semiconductor switching element by the short pulse signal. However, PTL 1 does not disclose how to transmit the signal representing the temperature information and the signal representing the abnormality information while decreasing the number of insulation elements in the case where there is a plurality of semiconductor switching elements.

The present disclosure is devised in view of the foregoing issue. A major object of the present disclosure is to implement a control system transferring a signal representing temperature information and a signal representing abnormality information while decreasing the number of insulation elements in a power conversion apparatus including a plurality of semiconductor switching elements.

This configuration relates to a control system for a power conversion apparatus including a plurality of semiconductor switching elements connected to respective different reference potentials. The control system is applied to the power conversion apparatus and includes a control unit that controls open/close states of the plurality of semiconductor switching elements. The control system includes a plurality of transmission circuits that are connected to the reference potentials in correspondence with the semiconductor switching elements to transmit information on the corresponding semiconductor switching elements. The control unit and the plurality of transmission circuits are insulated from each other, and insulation elements are provided in connection paths between the control unit and the plurality of transmission circuits. The plurality of transmission circuits include: a first transmission circuit that has a first transmission unit transmitting to the control unit a binary output signal changing between High and Low to represent temperature information on the corresponding semiconductor switching element and a second transmission unit transmitting to the control unit an output signal fixed to one of High and Low to represent an abnormality in the corresponding semiconductor switching element; and a second transmission circuit having the second transmission unit. The output signal from the first transmission unit of the first transmission circuit and the output signal from the second transmission unit of the first transmission circuit are subjected to OR operation on the side nearer the first transmission circuit than to the insulation element such that, when the output signal from the second transmission unit of the first transmission circuit represents an abnormality in the corresponding semiconductor switching element, the output signal from the second transmission unit of the first transmission circuit takes precedence over the output signal from the first transmission unit of the first transmission circuit, and then the logical sum is output to the insulation element. The output signal from the insulation element corresponding to the first transmission circuit and the output signal from the insulation element of the second transmission circuit are subjected to OR operation on the side nearer the control unit than to the insulation element such that, when the output signal from the second transmission unit of the second transmission circuit represents an abnormality in the corresponding semiconductor switching element, the output signal from the insulation element corresponding to the second transmission circuit takes precedence over the output signal from the insulation element corresponding to the first transmission circuit, and then the logical sum is output to the control unit.

The plurality of semiconductor switching elements used in the power conversion apparatus can be regarded as substantially the same in temperature. Accordingly, the control unit is configured to acquire only the temperature of the semiconductor switching element connected to the same reference potential as that of the first transmission circuit. In this case, the temperature information and the abnormality information are transmitted from the first transmission circuit to the control unit via one insulation element, which makes it possible to decrease the number of insulation elements.

The output signal is fixed to one of High and Low to represent an abnormality in the corresponding semiconductor switching element and is transmitted from the second transmission unit of the first transmission circuit or the second transmission circuit to the control unit.

In the event of an abnormality occurring in the semiconductor switching element corresponding to the first transmission circuit, the output signal from the first transmission unit of the first transmission circuit and the output signal from the second transmission unit of the first transmission circuit are subjected to OR operation on the side nearer the first transmission circuit than to the insulation element such that the output signal from the second transmission unit takes precedence so that the output signal from the second transmission unit of the first transmission circuit can represent the abnormality in the corresponding semiconductor switching element, and then the logical sum is output to the insulation element. That is, in the event of an abnormality occurring in the semiconductor switching element corresponding to the first transmission circuit, the output signal from the insulation element corresponding to the first transmission circuit to the control unit is fixed to one of High and Low.

In the event of an abnormality occurring in the semiconductor switching element corresponding to the second transmission circuit, the output signal from the insulation element according to the first transmission circuit and the output signal from the insulation element of the second transmission circuit are subjected to OR operation on the side nearer the control unit than to the insulation element such that the output signal from the insulation element of the second transmission circuit takes precedence over the output signal from the insulation element according to the first transmission circuit so that the output signal from the second transmission unit of the second transmission circuit can represent the abnormality in the corresponding semiconductor switching element, and then the logical sum is output to the control unit.

That is, the logical sum is obtained such that the output signal from the second transmission unit of the first transmission circuit or the second transmission circuit takes precedence over the output signal from the first transmission unit of the first unit, and thus the input signal to the control unit is fixed to one of High and Low. Accordingly, in the event of an abnormality occurring in the plurality of semiconductor switching elements, the control unit can determine correctly the abnormality in the semiconductor switching element. That is, according to the foregoing configuration, it is possible to suppress erroneous determination on abnormality information by the control unit while decreasing the number of insulation elements.

BRIEF DESCRIPTION OF THE DRAWINGS

The foregoing object, other objects, features, and advantages of the present disclosure will be more clarified by the following detailed description with reference to the accompanying drawings.

DESCRIPTION OF EMBODIMENTS

First Embodiment

An embodiment of a control system for a power conversion apparatus applied to a hybrid vehicle will be described below with reference to the drawings.

Figure 1:
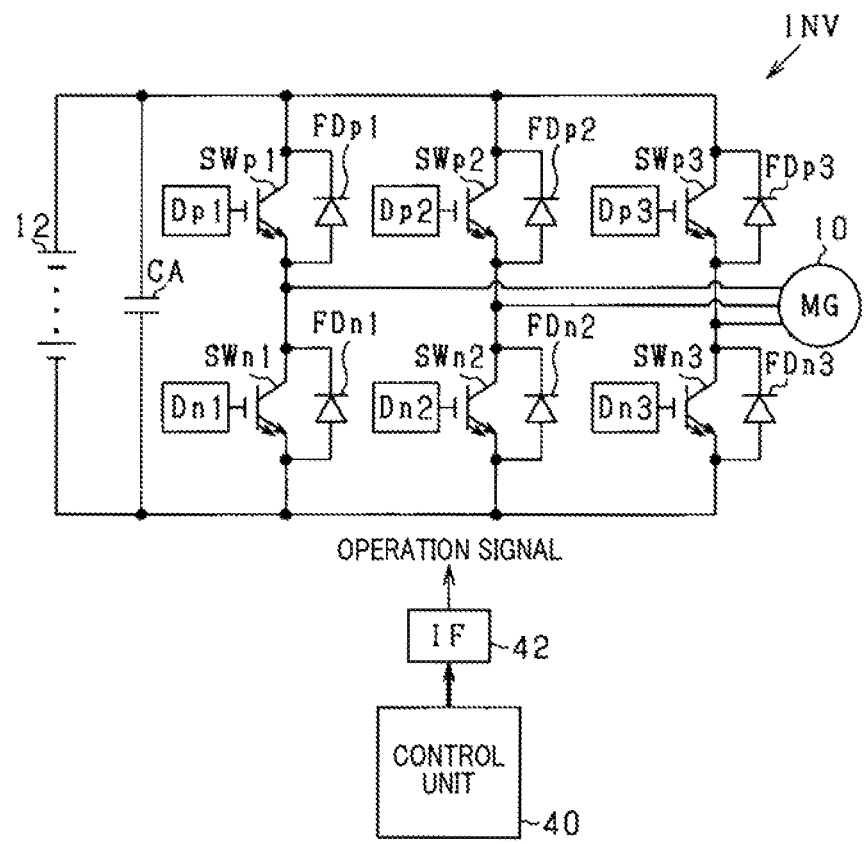
FIG. 1 is a diagram illustrating an electrical configuration of an inverter unit.

FIG. 1 illustrates an electrical configuration of the power conversion apparatus according to the present embodiment. A motor generator 10 is mechanically coupled to drive wheels or an internal combustion engine. The motor generator 10 is connected to an inverter unit INV. The inverter unit INV (power conversion circuit) converts direct-current power into alternating-current power with a voltage output from a direct-current power source 12 as an input voltage. The direct-current power source 12 is a high-voltage battery with a terminal voltage as high as 100 V or more, for example. The direct-current power source may be a step-up/step-down converter or the like.

The inverter unit INV is formed by connecting in parallel three serial connection bodies of high-voltage switching elements SWp1 to SWp3 (upper arm switches) and low-voltage switching elements SWn1 to SWn3 (lower arm switches). Connection points of the switching elements SWp1 to SWp3 and the switching elements SWn1 to SWn3 are connected to respective phases of the motor generator 10.

High-voltage freewheel diodes FDp1 to FDp3 and low-voltage freewheel diodes FDn1 to FDn3 have cathodes and anodes connected between input and output terminals (between collectors and emitters) of the high-voltage switching elements SWp1 to SWp3 and the low-voltage switching elements SWn1 to SWn3.

A capacitor CA is a smoothing capacitor that is connected to collectors of the upper arm switches SWp1 to SWp3 (high-voltage terminals) and emitters of the lower arm switches SWn1 to SWn3 (low-voltage terminals) to smooth out the voltages between the both terminals.

The semiconductor switching elements SW (SWp1 to SWp3 and SWn1 to SWn3) constituting the inverter unit INV are all power semiconductors, more specifically, insulated gate bipolar transistors (IGBTs).

A control unit 40 is a microcomputer as a digital processing unit that operates the inverter unit INV to control a controlled variable of the motor generator 10. Specifically, the control unit 40 operates the inverter unit INV by outputting operation signals to the switches SW of the inverter unit INV via an interface 42 including magnetic couplers Mp1 to Mp3 and Mn1 to Mn3 as insulation units described later.

More specifically, the control unit 40 outputs operation signals via the interface 42 to drive circuits Dp1 to Dp3 and Dn1 to Dn3 that input drive signals to control terminals (gates) of the switches SW. The interface 42 includes the insulation units for the purpose of insulating the high-voltage system including the inverter unit INV and the direct-current power source 12 from the low-voltage system including the control unit 40.

The emitters of the switches SWp1 to SWp3 and SWn1 to SWn3 are insulated from one another and connected to different reference potentials. The drive circuits Dp1 to Dp3 and Dn1 to Dn3 are connected to the emitters of the switches SWp1 to SWp3 and SWn1 to SWn3 as driving targets. The drive circuits Dp1 to Dp3 and Dn1 to Dn3 apply voltage to the gates of the switches SWp1 to SWp3 and SWn1 to SWn3 as driving targets with the potentials of the emitters of the switches SWp1 to SWp3 and SWn1 to SWn3 as driving targets, as reference potentials.

Figure 2:
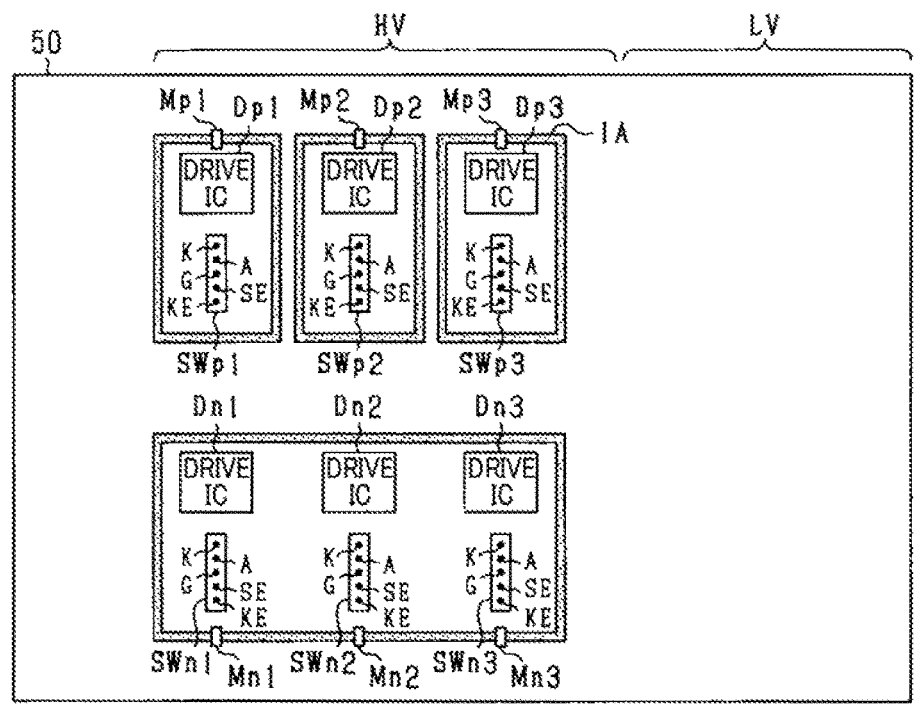
FIG. 2 is a schematic diagram illustrating a circuit board on which the inverter unit is implemented.

FIG. 2 illustrates a circuit board 50 on which the inverter unit INV according to the present embodiment is mounted. The circuit board 50 illustrated in FIG. 2 has both a high-voltage circuit region HV connected to the inverter unit INV and a low-voltage circuit region LV. Basically, the region on the right side of FIG. 2 (with reference to the upper arm switch SWp3, the side opposite to the side on which the upper arm switch SWp2 is provided) is the low-voltage circuit region LV, and the region on the middle-to-left side of FIG. 2 (with reference to the upper arm switch SWp3, the side on which the upper arm switch SWp2 is provided) is the high-voltage circuit region HV. However, some components constituting both the low-voltage system and the high-voltage system such as the magnetic couplers Mp1 to Mp3 and Mn1 to Mn3 are mixed in the high-voltage circuit region HV.

An electrolytic capacitor (not illustrated) for a flyback converter constituting a power circuit for the drive circuits Dp1 to Dp3 and Dn1 to Dn3 of the switches SW constituting the inverter unit INV is disposed in the low-voltage circuit region LV on the right side of FIG. 2 as a component of the low-voltage system. The primary winding side of a transformer (not illustrated) for the flyback converter constituting the power circuit for the drive circuits Dp1 to Dp3 and Dn1 to Dn3 is disposed in the low-voltage circuit region LV as a component of the low-voltage system, and the secondary winding side of the same is disposed in the high-voltage circuit region HV as a component of the high-voltage system.

Figure 3:
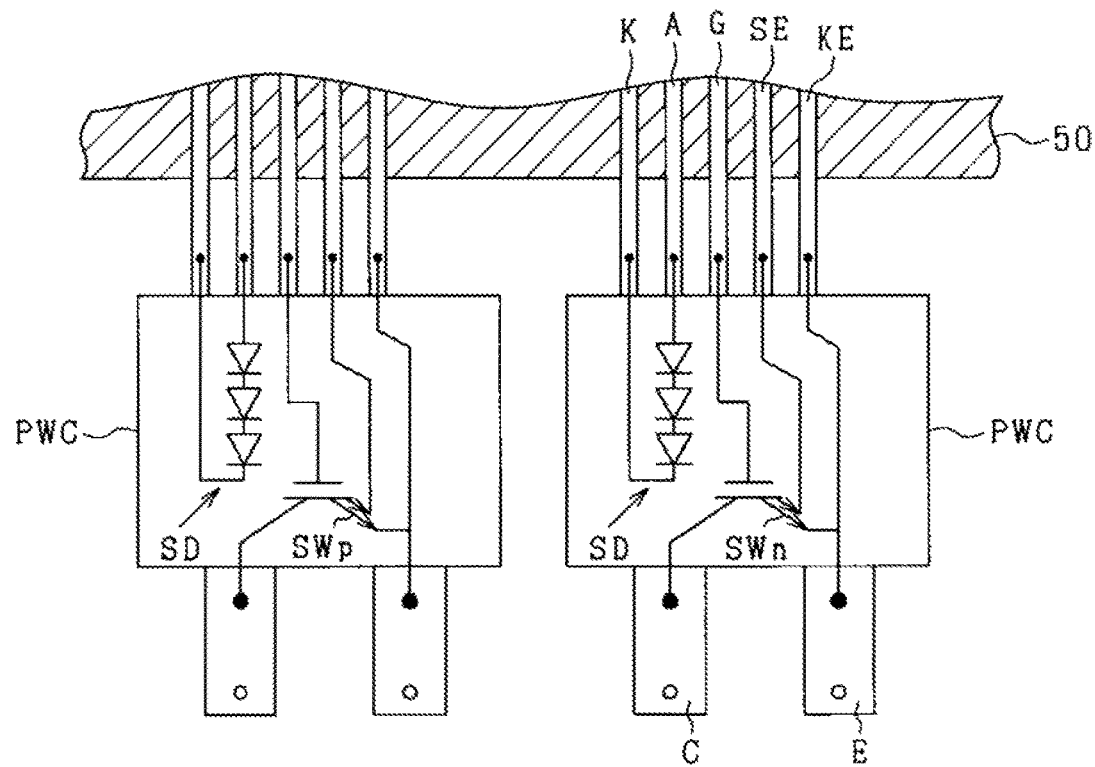
FIG. 3 is a schematic diagram illustrating a configuration of power cards (semiconductor switching elements)

As illustrated in FIG. 3, the switches SW constituting the inverter unit INV are inserted into the circuit board 50 from the back side of the circuit board 50 (the opposite of the side illustrated in FIG. 2) and connected to the circuit board 50. Each of the switches SW is coated by an insulating material together with other elements to constitute a power card PWC (module). The power card PWC also stores freewheel diodes FD and temperature-sensitive diodes SD, but FIG. 3 does not illustrate the freewheel diodes FD.

The power card PWC storing the high-voltage switch SWp and the power card PWC storing the low-voltage switch SWn are the same in structure. The power card PWC has a plurality of signal terminals externally exposed from the insulating material. Specifically, a gate terminal G of the switch SW, an emitter detection terminal KE, a sense terminal SE, and an anode A and a cathode K of the temperature-sensitive diodes SD are inserted into the circuit board 50 and connected to the circuit board 50. The emitter detection terminal KE is connected to the emitter E of the switch SW and constitutes an electrode under the same voltage as that of the emitter E. The collector detection terminal KC is connected to the collector of the switch SW and constitutes an electrode under the same voltage as that of the collector. The sense terminal SE is a terminal that outputs a minute electric current in correlation with the electric current flowing through the switch SW.

As illustrated in FIG. 2, the switches SW constitute the high-voltage system, and thus the circuit board 50 has insulation regions IA to insulate the switches SW from other circuits. The insulation regions IA are regions where no circuits (elements, wiring, and power supply patterns) are arranged.

FIG. 2 illustrates terminals of the power cards PWC including the upper arm switches SWp1 to SWp3 in the upper line. These terminals are insulated from each other by the insulation regions IA. The drive circuits Dp1 to Dp3 for driving the upper arm switches SWp1 to SWp3 are mounted in regions surrounded by the insulation regions IA. This is because the voltages of the emitter detection terminals KE of the upper arm switches SWp1 to SWp3 greatly fluctuate depending on whether the corresponding lower arm switches SWn1 to SWn3 are in an on state (closed state) or an off state (open state). Accordingly, the drive circuits Dp1 to Dp3 need to be insulated from one another though the operating voltages of the drive circuits Dp1 to Dp3 are low. The width of the insulation regions IA is determined by the law's demand or from a viewpoint of avoiding insulation breakdown or the like.

FIG. 2 illustrates terminals of the power cards PWC including the lower arm switches SWn1 to SWn3 in the lower line. The voltages of the emitter detection terminals KE corresponding to the lower arm switches SWn1 to SWn3 are close to one another, and thus the insulation regions IA are not provided between these switches. The operating voltages of the components of the drive circuits Dn1 to Dn3 are not necessarily high as compared to those of the components in the low-voltage circuit region LV. Accordingly, it is not necessarily required to provide the insulation regions 1A between the drive circuits Dn1 to Dn3 of the lower arm switches SWn1 to SWn3 on the circuit board 50.

However, the reference potentials of the drive circuits Dn1 to Dn3 (the potentials of the emitters of the corresponding switches SWn1 to SWn3) are different from one another depending on resistance components and inductive components between the emitters of the switches SWn1 to SWn3 during the operation of the inverter device INV. Accordingly, the drive circuits Dn1 to Dn3 are insulated from one another though the insulation regions IA are not provided between the drive circuits Dn1 to Dn3.

The drive circuits Dp1 to Dp3 and Dn1 to Dn3 (hereinafter, also referred to as drive circuits D) are connected to the gate terminals C and the emitter detection terminals KE of the corresponding switches SW to apply voltages to the gate terminals G of the switches SW, thereby to drive the switches SW.

Further, each of the drive circuits D of the present embodiment is connected to the sense terminal SE and the anode A and cathode K of the temperature-sensitive diodes SD in the corresponding switch SW. The drive circuit D detects the electric current flowing to the switch SW based on the voltage value of the sense terminal SE. The drive circuit D detects the temperature of the switch SW based on the voltage between the anode A and the cathode K of the temperature-sensitive diodes SD. The drive circuit D determines an abnormality in the switch SW based on the detection value of the electric current to the switch SW and the detection value of the temperature of the switch SW. The drive circuits D transmit the temperature information and the abnormality information on the switch SW to the control unit 40.

In the plurality of switches SWp1 to SWp3 and SWn1 to SWn3 used in the power circuit such as the inverter unit INV, the temperatures of the switches SWp1 to SWp3 and SWn1 to SWn3 can be regarded as substantially the same. Accordingly, to simplify the circuit configuration, the control unit 40 is configured to acquire only the temperature information on one of the switches SWp1 to SWp3 and SWn1 to SWn3.

When the control unit is configured to acquire the abnormality information on the plurality of switches SWp1 to SWp3 and SWn1 to SWn3, for simplification of the circuit configuration, the signals representing the abnormality information on the switches SWp1 to SWp3 and SWn1 to SWn3 are subjected to OR operation and the logical sum is input into the control unit 40.

Figure 4:
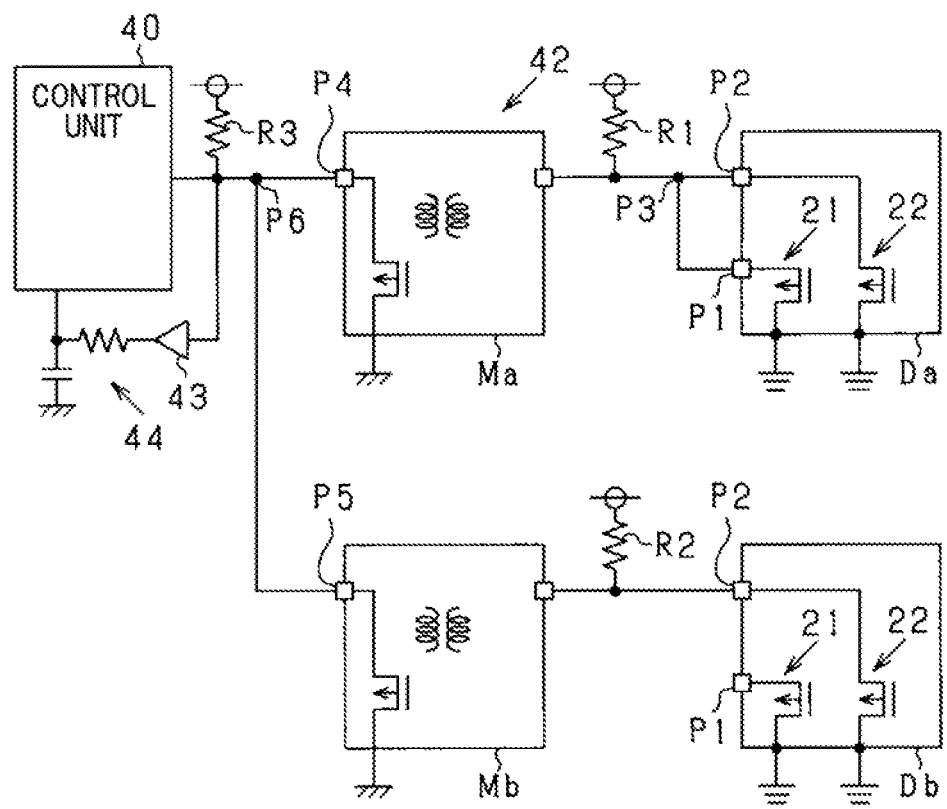
FIG. 4 is an electrical configuration diagram illustrating the connection between drive circuits and a control unit according to a first embodiment.

FIG. 4 illustrates schematically the connection between drive circuits Da and Db and the control unit 40 of the present embodiment. In this case, the first drive circuit Da is an arbitrary one of the drive circuits Dp1 to Dp3 and Dn1 to Dn3, for example, the drive circuit Dp1. The second drive circuit Db is an arbitrary one of the drive circuits Dp1 to Dp3 and Dn1 to Dn3 other than the first drive circuit, for example, the drive circuit Dp2.

Each of the drive circuits Da and Db includes a temperature information transmission unit 21 (first transmission unit) and an abnormality information transmission unit 22 (second transmission unit). In the switches SWp1 to SWp3 and SWn1 to SWn3 used in the inverter unit INV, the temperatures of the switches SWp1 to SWp3 and SWn1 to SWn3 can be regarded as substantially the same. Thus, the control unit 40 is configured to acquire only the temperature information on the switch SW connected to the reference potential identical to the first drive circuit Da (first transmission circuit). Accordingly, the temperature information transmission unit 21 of the second drive circuit Db (second transmission circuit) is deactivated. Specifically, an output terminal P1 of the temperature information transmission unit 21 in the drive circuit Db is not connected to other elements but is in a floating state.

The output (output terminal P1) of the temperature information transmission unit 21 in the first drive circuit Da and the output (output terminal P2) of the abnormality information transmission unit 22 in the first drive circuit Da are subjected to OR operation and the logical sum is connected to the first magnetic coupler Ma. In this case, the output terminal P1 of the temperature information transmission unit 21 and the output terminal P2 of the abnormality information transmission unit 22 are both open drain outputs, and are hard-wired at a connection point P3 and connected to a pull-up resistor R1 to obtain the logical sum by wired-OR. The output terminal P2 of the abnormality information transmission unit in the second drive circuit Db is connected to a pull-up resistor R2 and then connected to a second magnetic coupler Mb. That is, the control unit 40 and the drive circuits Da and Db are insulated from each other, and the magnetic couplers Ma and Mb are respectively provided in the connection paths between the control unit 40 and the drive circuits Da and Db.

The magnetic couplers Ma and Mb are a kind of insulation elements. The insulation element is an element that insulates the reception side and the transmission side of the insulation element from each other and transmits a signal received from an element on the reception side to an element on the transmission side. The magnetic coupler magnetically couples the reception side and the transmission side to insulate the reception side and the transmission side of the insulation element from each other, and transmits a signal received from an element on the reception side to an element on the transmission side. For example, the magnetic coupler has a reception coil provided on the reception side and a transmission coil provided on the transmission side as elements coupling magnetically the reception side and the transmission side. The magnetic coupler changes the magnetic field by supplying a current (signal) to the reception coil to change a current or voltage to the transmission coil. Accordingly, the magnetic coupler transmits a signal received from an element on the reception side to an element on the transmission side. For example, the magnetic coupler has a reception coil provided on the reception side and a magneto-resistance effect element provided on the transmission side as elements coupling magnetically the reception side and the transmission side. The magnetic coupler changes the magnetic field by supplying a current (signal) to the reception coil to change the resistance in the magneto-resistance effect element to change a current or voltage to the transmission side. Accordingly, the magnetic coupler transmits a signal received from an element on the reception side to an element on the transmission side.

The magnetic couplers Ma and Mb are open drain output insulation elements. The first magnetic coupler Ma outputs a signal input from the first drive circuit Da from an output terminal P4, and the second magnetic coupler Mb outputs a signal input from the second drive circuit Db from an output terminal P5. The output signal from the first magnetic coupler Ma and the output signal from the second magnetic coupler Mb are subjected to OR operation and the logical sum is input into the control unit 40. Specifically, the output terminal P4 of the first magnetic coupler Ma and the output terminal P5 of the second magnetic coupler Mb are both connected to the connection point P6 and connected to a pull-up resistor R3 to obtain the logical sum by wired OR, and the logical sum is input into the control unit 40.

The output signal from the first magnetic coupler Ma and the output signal from the second magnetic coupler Mb are subjected to OR operation and the logical sum is input into a buffer 43 as a high-impedance input element. The output signal from the buffer 43 is input into the control unit 40 via a low-pass filter 44.

Figure 5:
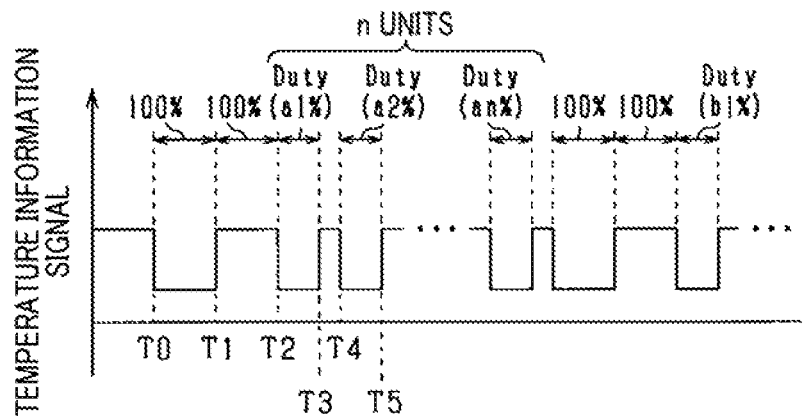
FIG. 5 is a timing chart of a temperature information signal according to the first embodiment.

FIG. 5 is a timing chart representing temporal changes in the temperature information signal output from the drive circuit D. The temperature information transmission unit 21 of the drive circuit D transmits to the control unit 40 a binary output signal changing between High and Low to represent temperature information on the corresponding switch SW. More specifically, the temperature information transmission unit 21 of the drive circuit D outputs temperature information by a time ratio (duty). In this case, the drive circuit D and the control unit 40 are not in synchronization. Accordingly, the drive circuit D notifies the control unit 40 of a reference period as a reference for representing the temperature information by a time ratio.

Specifically, as illustrated in FIG. 5, a switch (MOS-FET) constituting the temperature information transmission unit 21 is turned on at time T0 to bring the output signal into the low state. After the time T0, the switch of the temperature information transmission unit 21 is turned off at time T1 when a period of time equivalent to the reference period has elapsed to bring the output signal into a high state. After the time T1, the switch of the temperature information transmission unit 21 is turned on at time T2 when the period of time equivalent to the reference period has elapsed to bring the output signal into a low state. That is, before transmission of the temperature information, the temperature information transmission unit 21 changes the output signal from high to low for the reference period and then changes the output signal from low to high for the reference period to notify the reference period to the control unit 40. The control unit 40 acquires the length of the period of time during which the signal is kept in a low state at times T0 to T1 and the length of the period of time during which the signal is kept in a high state at times T1 to T2 as the reference period.

Before transmitting the temperature information and after changing the output signal from high to low for the reference period, the period of time (times T1 to T2) during which the output signal is changed from high to low for the reference period may be omitted. In the configuration without the period of time (times T1 to T2) during which the output signal is changed from low to high for the reference period, the output signal may be kept in a high state for a longer period of time than the reference period (for example, a period of time two times as long as the reference period) before the period of time (times T0 to T1) during which the output signal is changed from high to low for the reference period. According to this configuration, the control unit 40 can easily determine the change in the output signal from times T0 to T1 as a notification of the reference period.

After time T2, the temperature information transmission unit 21 outputs from times T2 to T3 a pulse having a predetermined time ratio (a1%) with respect to the reference period of times from T2 to T4. Specifically, the switch of the temperature information transmission unit 21 is turned on for a period of times from T2 to T3 to keep the output signal in a low state. Then, the switch of the temperature information transmission unit 21 is turned off for a period of times from T3 to T4 to bring the output signal into a high state. In this case, the predetermined time ratio a1% is set by the temperature information transmission unit 21 based on the temperature of the switch SW acquired by the drive circuit D from the temperature-sensitive diodes SD.

After time T4, the temperature information transmission unit 21 outputs from times T4 to T5 a pulse at a predetermined time ratio (a2%) with respect to the reference period. The temperature information transmission unit 21 transmits a pulse representing the temperature by a time ratio n times, and then transmits again the signal representing the reference period (n represents 64, for example).

The time ratio set by the temperature information transmission unit 21 of the drive circuit D will be described below. The temperature-sensitive diodes SD (see FIG. 3) are connected to a constant current circuit so that a constant current flows to the temperature-sensitive diodes SD. The drive circuit D acquires the voltage between the anode A and the cathode K of the temperature-sensitive diodes SD, that is, the forward drop voltage (analog value) of the temperature-sensitive diodes SD. The temperature information transmission unit 21 performs PWM modulation on the forward drop voltage of the temperature-sensitive diodes SD to convert the same into a temperature information signal, which is a digital signal, and outputs the signal to the control unit 40. The temperature information signal has a predetermined time ratio in accordance with the forward drop voltage of the temperature-sensitive diodes SD. The forward drop voltage of the temperature-sensitive diode SD takes a value in accordance with the temperature of the temperature-sensitive diodes SD, that is, the switch SW. Accordingly, the time ratio included in the temperature information signal takes a value in accordance with the temperature of the switch SW.

For example, the temperature information transmission unit 21 converts the forward drop voltage of the temperature-sensitive diodes SD with the temperature of the switch SW equal to and less than the minimum temperature A° C. (for example, −50° C.) into a signal having a time ratio of 0%. The temperature information transmission unit 21 also converts the forward drop voltage of the temperature-sensitive diodes SD with the temperature of the switch SW equal to and higher than the maximum temperature B° C. (for example, 200° C. into a signal having a time ratio of 100%. The temperature information transmission unit 21 then converts the forward drop voltage of the temperature-sensitive diodes SD with the temperature T of the switch SW between A° C. to B° C. into a signal having a time ratio of (T−A)/(B−A) %. The minimum temperature A° C. and the maximum temperature B° C. of the switch SW are set depending on the usage environments of the switch SW. In the foregoing description, the time ratio is changed linearly in accordance with the temperature T of the switch SW. Alternatively, the time ratio may be changed non-linearly.

Figures 6, 7:
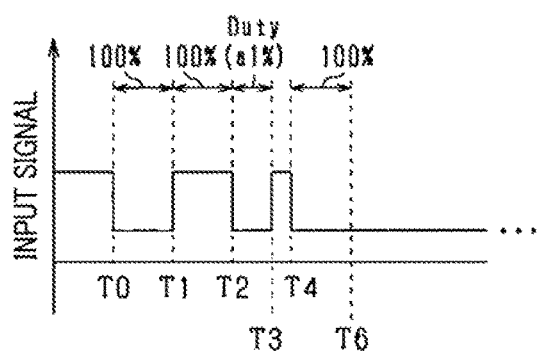
FIG. 6 is a truth table indicating states of signals in accordance with normality and abnormality of switches.
FIG. 7 is a timing chart of an input signal to the control unit according to the first embodiment.

FIG. 6 is a truth table indicating states of signals from the respective portions of the circuit when a switching element SWa corresponding to the first drive circuit Da and a switching element SWb corresponding to the second drive circuit Db are normal or abnormal.

When the switching element SWa is normal, the terminal P1 of the first drive circuit Da changes in state at a time ratio in accordance with the temperature of the switching element SWa, and the terminal P2 of the first drive circuit Da is in a high-impedance state. Accordingly, when the switching element SWa is normal, the connection point P3 corresponding to the first drive circuit Da changes in state at a time ratio in accordance with the temperature of the switching element SWa, and the output signal from the first magnetic coupler Ma changes in state at a time ratio in accordance with the temperature of the switching element SWa.

When the switching element SWa is abnormal, the terminal P1 of the first drive circuit Da changes in state at a time ratio in accordance with the temperature of the switching element SWa, and the terminal P2 of the first drive circuit Da is in a low state. Accordingly, when the switching element SWa is abnormal, the connection point P3 corresponding to the first drive circuit Da is in a low state and the output signal from the first magnetic coupler Ma is in a low state.

When the switching element SWb is normal, the terminal P2 of the second drive circuit Db is in a high-impedance state. Accordingly, the output signal from the second magnetic coupler Mb is in a high-impedance state.

When the switching element SWb is abnormal, the terminal P2 of the second drive circuit Db is in a low state. Accordingly, the output signal from the second magnetic coupler Mb is in a low state.

Accordingly, when both of the switching elements SWa and SWb are normal, the input signal to the control unit 40 (the signal at the connection point P6) becomes a signal changed in state at a time ratio because the logical sum of the signal changed in state at a time ratio output from the magnetic coupler Ma and the signal in a high-impedance state output from the second magnetic coupler Mb is obtained by wired-OR.

When the switching element SWa is abnormal and the switching element SWb is normal, the input signal to the control unit 40 (the signal at the connection point P6) becomes a signal in a low state because the logical sum of the signal changed in state at a time ratio output from the magnetic coupler Ma and the signal in a low state output from the second magnetic coupler Mb is obtained by wired-OR.

When the switching element SWa is normal and the switching element SWb is abnormal, the input signal to the control unit 40 (the signal at the connection point P6) becomes a signal in a low state because the logical sum of the signal in a low state output from the magnetic coupler Ma and the signal in a high-impedance state output from the second magnetic coupler Mb is obtained by wired-OR.

When both of the switching elements SWa and SWb are abnormal, the input signal to the control unit 40 (the signal at the connection point P6) becomes a signal in a low state because the logical sum of the signal in a low state output from the magnetic coupler Ma and the signal in a low state output from the second magnetic coupler Mb is obtained by wired OR.

When all the switches SW are normal, the transmission signals from the abnormality information transmission units 22 of all the drive circuits D are in high states. Accordingly, the input signal to the control unit 40 (a superimposed signal of the temperature information signal transmitted from the first drive circuit Da and the abnormality information signals transmitted from the first drive circuit Da and the second drive circuit Db) takes the same waveform as that of the temperature information signal illustrated in FIG. 5.

FIG. 7 is a timing chart representing a temporal change in the input signal to the control unit 40 in the event of an abnormality occurring in any of the switches SW.

The waveform of the input signal to the control unit 40 at times T0 to T4 is the same as the waveform of the temperature information signal illustrated in FIG. 5. In this case, at times T4 to T5, when an abnormality occurs in any of the switches SW, the output signal from the abnormality information transmission unit 22 of the corresponding drive circuit D is fixed in a low state. Accordingly, the input signal as a superimposed signal of the temperature information signal transmitted from the first drive circuit Da and the abnormality information signals transmitted from the first drive circuit Da and the second drive circuit Db is fixed in a low state.

At time T6, a period of time equivalent to the reference period has elapsed since time T4. The control unit 40 determines that an abnormality has occurred in any of the switches SW because the input signal is low for a longer period of time than the reference period. Specifically, the control unit 40 determines that the input signal is low for a longer period of time than the reference period based on the voltage value of the signal input from the low-pass filter 44.

Advantageous effects of the present embodiment will be described below.

In the plurality of switches SWp1 to SWp3 and SWn1 to SWn3 used in the inverter device INV, the temperatures of the switches SW can be regarded as substantially the same. Accordingly, the control unit 40 is configured to acquire only the temperature of the switch SW connected to the same reference potential as that of the first drive circuit Da. In this case, the temperature information and the abnormality information are transmitted via one magnetic coupler Ma from the first drive circuit Da to the control unit 40, thereby decreasing the number of magnetic couplers for use in the circuit.

In the event of an abnormality occurring in the switch SWa corresponding to the first drive circuit Da, the signal representing the abnormality information output from the abnormality information transmission unit 22 of the first drive circuit Da is fixed in a low state, and the logical sum of the output signals is obtained on the side nearer the drive circuit Da than to the magnetic coupler Ma such that the signal representing the abnormality information output from the abnormality information transmission unit 22 of the first drive circuit Da takes precedence over the signal representing the temperature information output from the temperature information transmission unit 21 of the first drive circuit Da. Then, the ORed signal is input into the magnetic coupler Ma.

In the event of an abnormality occurring in the switch SWb corresponding to the second drive circuit Db, the output signal representing the abnormality information from the abnormality information transmission unit 22 of the second drive circuit Db is fixed in a low state, and the logical sum of the signals is obtained on the side nearer the control unit 40 than to the magnetic couplers Ma and Mb such that the output signal from the magnetic coupler Mb takes precedence over the output signal from the magnetic coupler Ma. Then, the ORed signal is input into the control unit 40.

Accordingly, in the event of an abnormality occurring in at least one of the switches SWa and SWb corresponding to the first drive circuit Da or the second drive circuit Db, the input signal to the control unit 40 is fixed in a low state. Accordingly, in the event of an abnormality occurring in any of the plurality of switches SWp1 to SWp3 and SWn1 to SWn3, the control unit 40 can determine correctly the abnormality in any of the switches SWp1 to SWp3 and SWn1 to SWn3. That is, according to the foregoing configuration, it is possible to suppress erroneous determination on the abnormality information by the control unit 40 while decreasing the number of magnetic couplers used in the circuit.

Specifically, the temperature information is output from the first drive circuit Da to the control unit 40 at a ratio of time (time ratio) during which the output signal is in a high state in a predetermined period. Accordingly, the maximum value of the wavelength of the pulse representing the temperature information becomes the predetermined period. When the signal input to the control unit 40 is in a low state for a longer period of time than the predetermined period, the control unit 40 determines that an abnormality has occurred in any of the plurality of switches SWp1 to SWp3 and SWn1 to SWn3. According to this configuration, it is possible to prevent erroneous determination on the occurrence of an abnormality and determine quickly the occurrence of an abnormality.

The control unit 40 and the drive circuits Da and Db are different in operating frequency. Accordingly, to transmit the temperature information at a ratio of time (duty) in which the signal is in a low state in the predetermined period (reference period), the predetermined period is notified in advance. More specifically, before the transmission of the temperature information, the output signal is changed from high to low for the predetermined period, and then the output signal is changed from low to high for the predetermined period. According to this configuration, even when the control unit 40 and the drive circuits Da and Db are different in operating frequency, it is possible to transmit the temperature information from the drive circuit Da and suppress erroneous determination on the occurrence of an abnormality in the switch SW by the control unit 40.

Hard-wiring the open drain outputs of the magnetic couplers Ma and Mb makes it possible to obtain the logical sum (wired OR) in a simple configuration. In particular, implementing wired OR by negative logic eliminates the need to add elements such as diodes and simplifies the circuit configuration, compared with a case of implementing wired OR by positive logic.

In the foregoing configuration, the drive circuits Da and Db are common in structure. This enables cost reduction. In addition, the first drive circuit Da can be changed among the drive circuits Dp1 to Dp3 and Dn1 to Dn3 by a simple circuit change.

Any of the drive circuits Dp1 to Dp3 and Dn1 to Dn3 corresponding to one of the switches SW at the highest temperature is selected as the first drive circuit Da. Detecting the temperature of the switch SW at the highest temperature and controlling the detected value so as not to be equal to or higher than a predetermined threshold makes it possible to prevent the temperatures of all the switches SW from becoming equal to or higher than the predetermined threshold.

Second Embodiment

In the first embodiment, the drive circuits D and the magnetic couplers M output signals by negative logic. This configuration may be changed so that the drive circuits D and the magnetic couplers M may output signals by positive logic.

Figure 8:
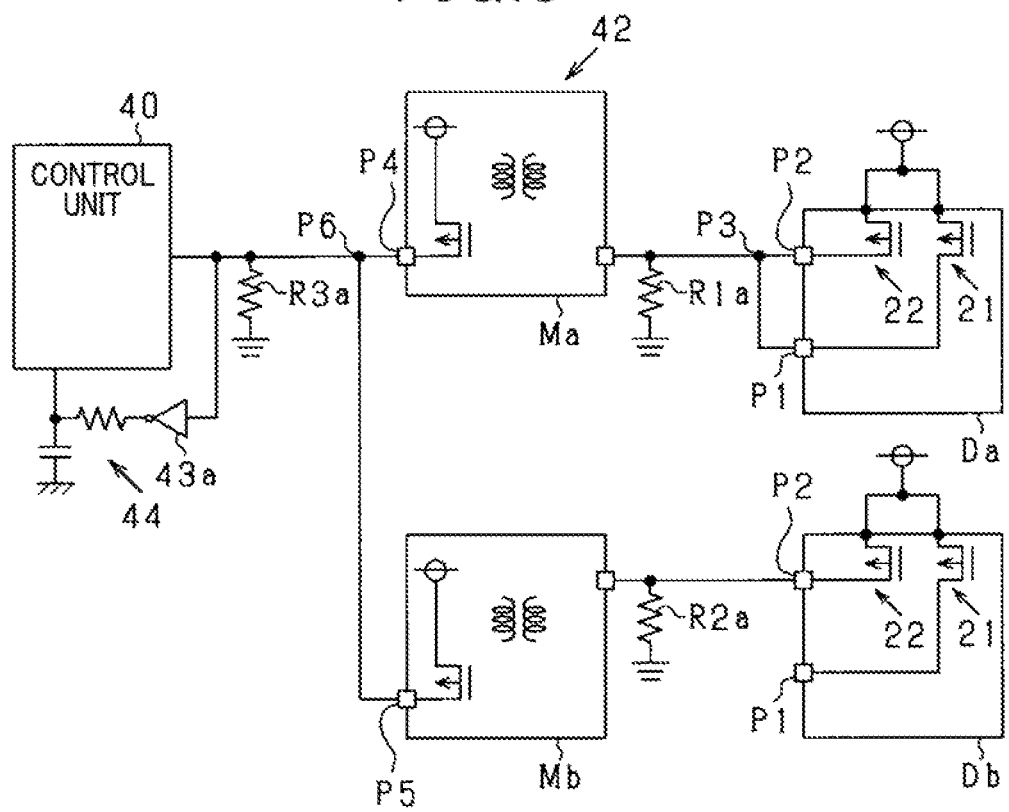
FIG. 8 is an electrical configuration diagram illustrating a connection between drive circuits and a control unit according to a second embodiment.

FIG. 8 is a schematic diagram illustrating the connection between the drive circuits D and the control unit 40 according to the present embodiment. In FIG. 8, the same components as those illustrated in FIG. 4 are given the same reference signs as those illustrated in FIG. 4, and descriptions thereof will be omitted as appropriate. Both the temperature information transmission units 21 and the abnormality information transmission units 22 of this modification example output signals by positive logic (active high). In addition, both the temperature information transmission unit 21 and the abnormality information transmission unit 22 are open source outputs.

Accordingly, wired OR is implemented on the side nearer the drive circuit Da than to the magnetic coupler Ma by hard-wiring at the connection point P3 the output (terminal P1) of the temperature information transmission unit 21 of the drive circuit Da and the output (terminal P2) of the abnormality information transmission unit 22 of the drive circuit Da. The output of the temperature information transmission unit 21 of the drive circuit Da and the output of the abnormality information transmission unit 22 of the drive circuit Da are hard-wired at the connection point P3, and are also connected to a pull-down resistor R1a and then input into the magnetic coupler Ma. In addition, the output (terminal P2) of the abnormality information transmission unit 22 of the drive circuit Db is connected to a pull-down resistor R2a and then input into the magnetic coupler Mb.

The magnetic coupler Ma and the magnetic coupler Mb are both open source outputs. Wired OR is implemented by hard-wiring the output (terminal P4) of the magnetic coupler Ma and the output (terminal P5) of the magnetic coupler Mb at the connection point P6 and connecting to a pull-down resistor R3a. The output signal from the first magnetic coupler Ma and the output signal from the second magnetic coupler Mb are subjected to wired OR and input into a NOT circuit 43a as an element of high impedance input. The output signal from the NOT circuit 43a is input into the control unit 40 via the low-pass filter 44.

When the logic on the input side of the magnetic coupler M (the output logic of the drive circuit D) is negative logic, the configuration illustrated in FIG. 4 is applied. When the logic on the input side of the magnetic coupler M (the output logic of the drive circuit D) is positive logic, the configuration illustrated in FIG. 8 is applied. Accordingly, it is possible to transmit signals representing the temperature information and the abnormality information in either case where the logic on the input side of the magnetic coupler M is negative logic or positive logic.

In the first embodiment and the second embodiment, the magnetic coupler M may reverse the output logic of the drive circuit D. That is, the magnetic coupler M may convert the positive logic signal output from the drive circuit D into negative logic, and output the same, or may convert the negative logical signal output from the drive circuits D into positive logic, and output the same.

Figure 9:
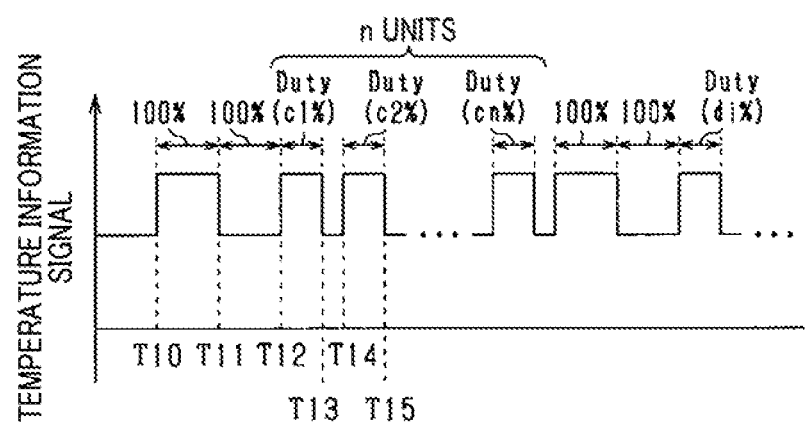
FIG. 9 is a timing chart of a temperature information signal according to the second embodiment.
Figure 10:
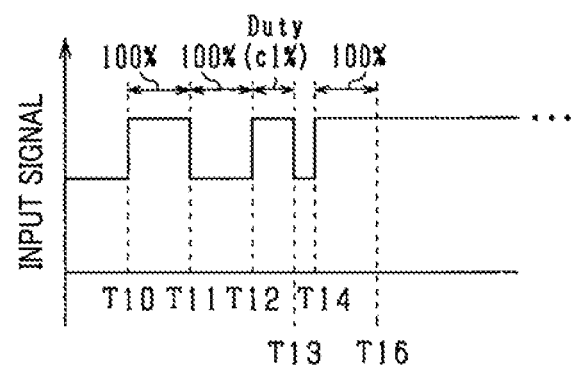
FIG. 10 is a timing chart of an input signal to the control unit according to the second embodiment.

In the configuration of the second embodiment, the temperature information signal becomes a signal as illustrated in FIG. 9, and the input signal to the control unit 40 becomes a signal as illustrated in FIG. 10.

As illustrated in FIG. 9, at time T10, the temperature information transmission unit 21 brings the temperature information signal into the high state. After the time T10, the temperature information transmission unit 21 brings the temperature information signal into a low state at time T11 when a period of time equivalent to the reference period has elapsed. After the time T11, the temperature information transmission unit 21 brings the temperature information signal into a high state at time T12 when the period of time equivalent to the reference period has elapsed. The control unit 40 acquires the length of the period of time during which the signal is in a high state at times T10 to T11 and the length of the period of time during which the signal is in a low state at times T11 to T12 as the reference period.

After time T12, the temperature information transmission unit 21 outputs from times T12 to T13 a pulse having a predetermined time ratio (c1%) with respect to the reference period of times from T12 to T14. Specifically, the output signal from the temperature information transmission unit 21 is kept in a high state from a period of times from T12 to T13. Then, the output signal from the temperature information transmission unit 21 is kept in a low state for a period of times from T13 to T14. In this case, the predetermined time ratio c1% is set by the temperature information transmission unit 21 based on the temperature of the switch SW acquired by the drive circuit D from the temperature-sensitive diodes SD.

FIG. 10 illustrates a timing chart indicating temporal changes in the input signal to the control unit 40 in the event of an abnormality in any of the switches SW.

The waveform of the input signal to the control unit 40 from times T10 to T14 is the same as the waveform of the temperature information signal illustrated in FIG. 9. In this case, at times T14 to T15, when an abnormality occurs in any of the switches SW, the output signal from the abnormality information transmission unit 22 of the corresponding drive circuit D is fixed in a high state. Accordingly, the input signal to the control unit 40 as a superimposed signal of the temperature information signal transmitted from the first drive circuit Da and the abnormality information signals transmitted from the first drive circuit Da and the second drive circuit Db is fixed in a high state.

At time T16, a period of time equivalent to the reference period has elapsed since time T14. The control unit 40 determines that an abnormality has occurred in any of the switches SW because the input signal is high for a longer period of time than the reference period. In this manner, the control unit 40 can determine the occurrence of an abnormality in the switch SW even in the configuration in which the drive circuits D and the magnetic couplers M output signals by positive logic.

Third Embodiment

In the first embodiment and the second embodiment, the temperature information is transmitted at a ratio of time (time ratio) during which the output signal is kept in q low state or q high state in the predetermined reference period. The temperature information transmission unit 21 in the third embodiment transmits the temperature information on the switch SW by a pulse indicative of 1 or 0. Specifically, the temperature information transmission unit 21 outputs the temperature information by a binary number to the control unit 40.

Figure 11:
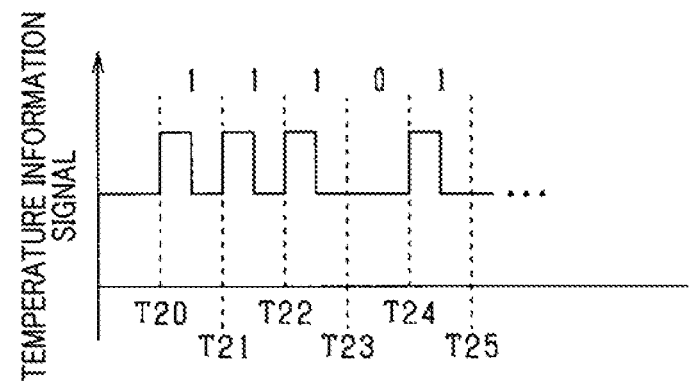
FIG. 11 is a timing chart of a temperature information signal according to a third embodiment.

As illustrated in FIG. 11, in periods T20 to T21, T21 to T22, T22 to T23, T23 to T24, and T24 to T25 divided by a predetermined period, the temperature information transmission unit 21 transmits a pulse having a time ratio of 50% to represent 1 or transmits no pulse to represent 0.

Figure 12:
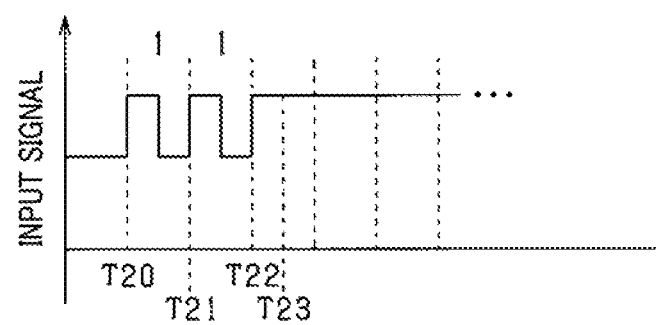
FIG. 12 is a timing chart of an input signal to a control unit according to the third embodiment.

FIG. 12 illustrates a timing chart indicating temporal changes in the input signal to the control unit 40 in the event of an abnormality in any of the switches SW. Since an abnormality has occurred at times T22 to T23, the abnormality information transmission unit 22 fixes the output signal in a high state. Accordingly, the input signal to the control unit 40 is kept in a high state at time T23 and afterward. When the input signal is in a high state for a longer period of time than the wavelength of the pulse indicative of 1, the control unit 40 determines that an abnormality has occurred in any of the switches SW.

Other Embodiments

In the first embodiment and the second embodiment, the drive circuits D may output signals by positive logic and the magnetic couplers M may output signals by negative logic. Alternatively, the drive circuits D may output signals by negative logic and the magnetic couplers M may output signals by positive logic.

In the third embodiment, the drive circuits D output signals by positive logic. However, this configuration may be changed such that the drive circuits D output signals by negative logic. The temperature information transmission unit 21 may transmit a pulse to represent 0 or may transmit no pulse to represent 1.

In the foregoing embodiments, the drive circuit D includes the temperature information transmission unit 21 and the abnormality information transmission unit 22. This configuration may be changed such that any transmission circuit other than the drive circuit may include the temperature information transmission unit 21 and the abnormality information transmission unit 22.

In the foregoing configuration, the logical sum of the output signals from the temperature information transmission unit 21 and the abnormality information transmission unit 22 of the first drive circuit Da is obtained by wired OR. This configuration may be changed such that the logical sum is obtained by a logical circuit. Similarly, the logical sum of the output signals from the magnetic couplers Ma and Mb is obtained by wired OR. This configuration may be changed such that the logical sum is produced by a logical circuit.

The magnetic couplers, and the temperature information transmission units and the abnormality information transmission units of the drive circuits may be open collector outputs instead of open drain outputs. They may be open emitter outputs or totem pole outputs instead of open source outputs.

The foregoing configuration may be applied to power conversion apparatuses other than the inverter unit. For example, the foregoing configuration may be applied to DCDC converter units.

As insulation elements, photocouplers or transformers may be used instead of magnetic couplers. Alternatively, capacitive couplers may be used instead of the magnetic couplers. The capacity coupler insulates the reception side and the transmission side of the insulation element by capacitively coupling the reception side and the transmission side, and transmits the signal received from an element on the reception side to an element on the transmission side. The capacity coupler has a capacitor as an element for capacitively coupling the reception side and the transmission side, for example.

As the semiconductor switching elements, MOS-FETs may be used instead of IGBTs.

The present disclosure has been described according to examples, but it is noted that the present disclosure is not limited to the foregoing examples or structures. The present disclosure includes various modifications and changes within a range of equivalency. In addition, various combinations and modes, and other combinations and modes including only one element of the foregoing combination and modes, or less or more than the one element fall within the scope and the spirit of the present disclosure.

The invention claimed is:

1. A control system for a power conversion apparatus (INV) including a plurality of semiconductor switching elements (SW, SWp1 to SWp3, SWn1 to SWn3) connected to respective different reference potentials, the control system being applied to the power conversion apparatus and including a control unit controlling open/close states of the plurality of semiconductor switching elements, the control system comprising:
   a plurality of transmission circuits (Da, Db, Dp1 to Dp3, Dn1 to Dn3) that are connected to the respective reference potentials in correspondence with the semiconductor switching elements to transmit information on the corresponding semiconductor switching elements, wherein
   the control unit and the plurality of transmission circuits are insulated from each other, and insulation elements are provided in connection paths between the control unit and the plurality of transmission circuits,
   the plurality of transmission circuits include: a first transmission circuit (Da) that has a first transmission unit transmitting to the control unit a binary output signal changing between High and Low to represent temperature information on the corresponding semiconductor switching element and a second transmission unit transmitting to the control unit an output signal fixed to one of High and Low to represent an abnormality in the corresponding semiconductor switching element; and a second transmission circuit (Db) that has the second transmission unit,
   the output signal from the first transmission unit of the first transmission circuit and the output signal from the second transmission unit of the first transmission circuit are subjected to OR operation on the side nearer the first transmission circuit than to the insulation element such that, when the output signal from the second transmission unit of the first transmission circuit represents an abnormality in the corresponding semiconductor switching element, the output signal from the second transmission unit of the first transmission circuit takes precedence over the output signal from the first transmission unit of the first transmission circuit, and then the logical sum is output to the insulation element, and the output signal from the insulation element corresponding to the first transmission circuit and the output signal from the insulation element of the second transmission circuit are subjected to OR operation on the side nearer the control unit than to the insulation element such that, when the output signal from the second transmission unit of the second transmission circuit represents an abnormality in the corresponding semiconductor switching element, the output signal from the insulation element corresponding to the second transmission circuit takes precedence over the output signal from the insulation element corresponding to the first transmission circuit, and then the logical sum is output to the control unit.

2. The control system for the power conversion apparatus according to claim 1, wherein the first transmission unit transmits to the control unit temperature information on the semiconductor switching element at a time ratio at which an output signal is high or low in a predetermined period.

3. The control system for the power conversion apparatus according to claim 2, wherein when the input signal is high or low for a longer period of time than the predetermined period, the control unit determines that an abnormality has occurred in any of the plurality of semiconductor switching elements.

4. The control system for the power conversion apparatus according to claim 2, wherein, before transmitting the temperature information, the first transmission unit changes the output signal from one to the other of high and low for the predetermined period to notify the predetermined period to the control unit.

5. The control system for the power conversion apparatus according to claim 4, wherein, before transmitting the temperature information, the first transmission unit changes the output signal from one to the other of high and low for the predetermined period and then changes the output signal from the other to the one of high and low for the predetermined period to notify the predetermined period to the control unit.

6. The control system for the power conversion apparatus according to claim 1, wherein the first transmission unit transmits to the control unit the temperature information on the semiconductor switching element by a pulse indicative of 1 or 0, and when the input signal is high or low for a longer period of time than the wavelength of the pulse indicative of 1 or 0, the control unit determines that an abnormality has occurred in any of the plurality of semiconductor switching elements.

7. The control system for the power conversion apparatus according to claim 1, wherein the insulation element is an open collector output or an open drain output, and the output of the first transmission circuit and the output of the second transmission circuit are subjected to wired-OR on the side nearer the control unit than to the insulation element to obtain the logical sum such that the output signal from the second transmission unit takes precedence over the output signal from the first transmission unit, and the logical sum is output to the control unit.

8. The control system for the power conversion apparatus according to claim 1, wherein the second transmission circuit includes the first transmission unit and the second transmission unit, the first transmission unit and the second transmission unit are both open collector outputs or open drain outputs, the first transmission unit of the second transmission circuit is not connected to the insulation element, and the output of the first transmission unit of the first transmission circuit and the output of the second transmission unit of the first transmission circuit are subjected to wired-OR on the side nearer the first transmission circuit than to the insulation element to obtain the logical sum such that, when the output signal from the second transmission unit of the first transmission circuit represents an abnormality in the corresponding semiconductor switching element, the output signal from the second transmission unit of the first transmission circuit takes precedence over the output signal from the first transmission unit of the first transmission circuit, and the logical sum is output to the insulation element.

* * * * *